United States Patent [19]

Mori

[11] Patent Number: 4,612,913
[45] Date of Patent: Sep. 23, 1986

[54] SOLAR ENERGY COLLECTOR ARRAY

[75] Inventor: Hiroki Mori, Tokorozawa, Japan

[73] Assignee: Ilios Corporation of Japan, Tokyo, Japan

[21] Appl. No.: 702,455

[22] Filed: Feb. 19, 1985

[30] Foreign Application Priority Data

Apr. 3, 1984 [JP] Japan .................................. 59-66133

[51] Int. Cl.$^4$ .............................................. F24J 2/10
[52] U.S. Cl. .................................... 126/438; 126/424; 126/440; 126/439; 350/614
[58] Field of Search ............... 126/440, 438, 451, 439, 126/425, 424; 350/628, 613, 614

[56] References Cited

U.S. PATENT DOCUMENTS

| 3,393,034 | 7/1968 | Imai . |
| 3,711,188 | 1/1973 | Zehnpfennig . |
| 3,797,915 | 3/1974 | Land et al. ...................... 350/613 X |
| 3,902,794 | 9/1975 | Abrams . |
| 3,982,822 | 9/1976 | Conder et al. . |
| 4,082,433 | 4/1978 | Apeldorn et al. . |
| 4,108,540 | 8/1978 | Anderson et al. . |
| 4,158,222 | 1/1979 | Cook . |
| 4,194,949 | 3/1980 | Stark . |
| 4,257,401 | 3/1981 | Daniels .......................... 126/440 X |
| 4,266,530 | 5/1981 | Steadman . |
| 4,284,839 | 8/1981 | Johnson . |
| 4,315,671 | 1/1982 | Bunch . |
| 4,337,759 | 7/1982 | Popovich et al. . |
| 4,344,417 | 8/1982 | Malecek . |
| 4,344,673 | 8/1982 | Holdridge ........................... 350/614 |
| 4,365,618 | 12/1982 | Jones . |
| 4,382,437 | 5/1983 | Meckler . |
| 4,385,808 | 5/1983 | Vanderwerf . |
| 4,425,904 | 1/1984 | Butler . |
| 4,432,343 | 2/1984 | Riise et al. . |
| 4,463,749 | 7/1984 | Sobczak et al. . |
| 4,466,423 | 8/1984 | Dolan et al. . |

Primary Examiner—Larry Jones
Attorney, Agent, or Firm—Costas, Montgomery & Dorman

[57] ABSTRACT

A concentrating reflector adapted to focus light on a target spaced a predetermined distance from the reflector comprising a lens, a linear echelon element closely positioned to said lens and a mirror surface, the lens, the echelon element and the mirror surface being so arranged that light entering the lens and the echelon element is refracted and reflected back through the lens to said target for a given angle of incidence of light rays thereon.

11 Claims, 11 Drawing Figures

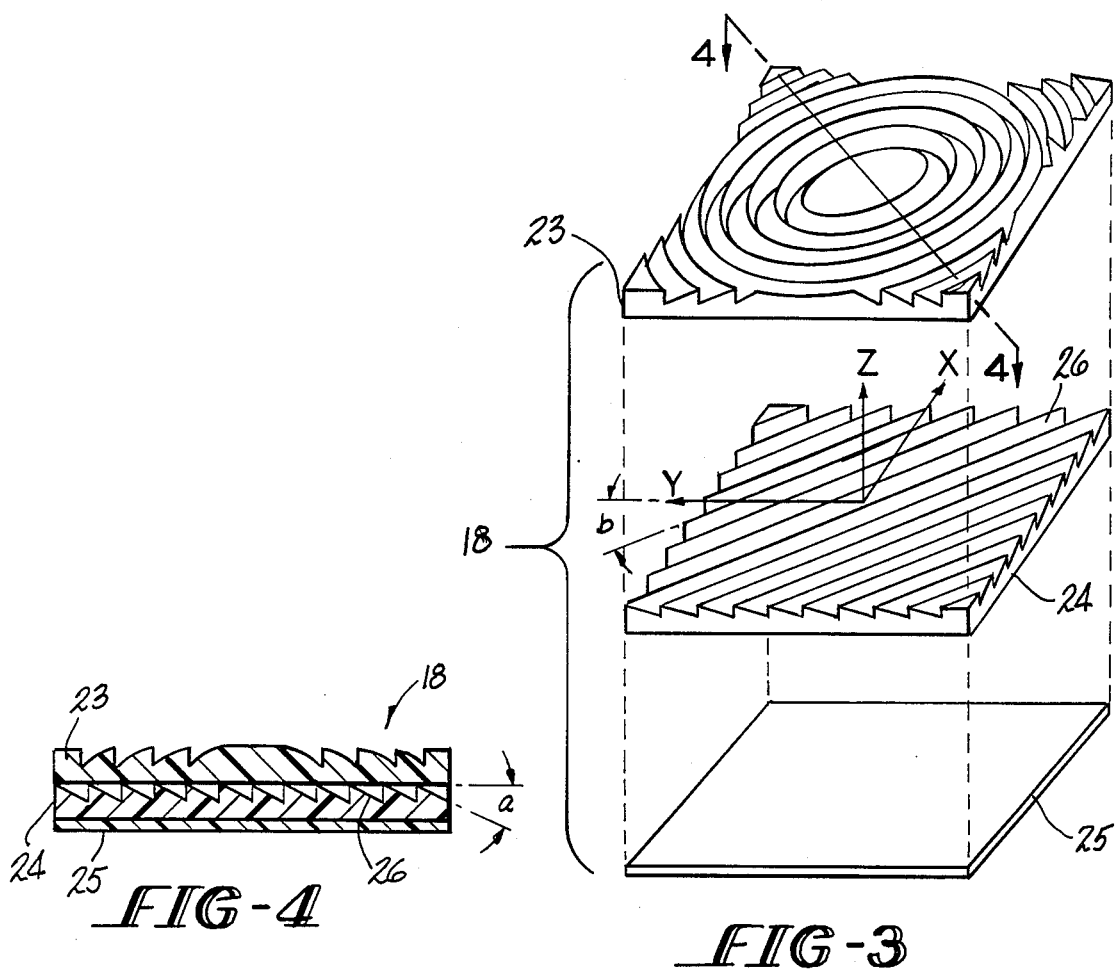
FIG-3
FIG-4
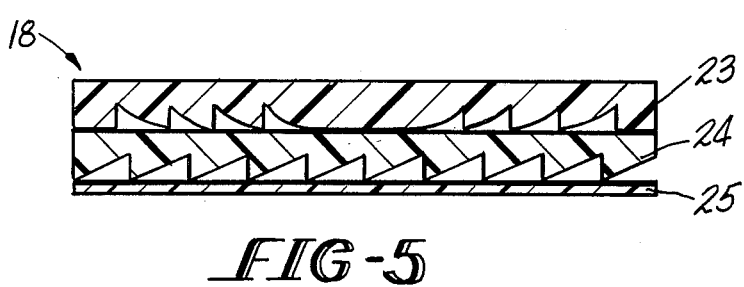
FIG-5
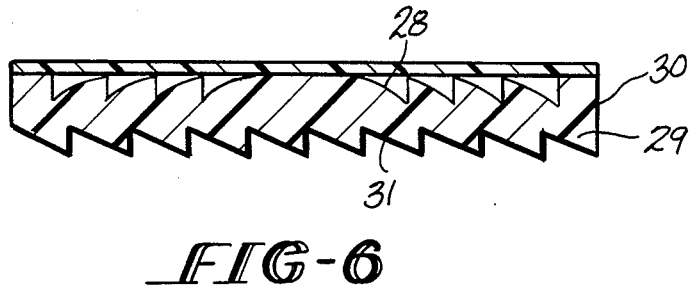
FIG-6

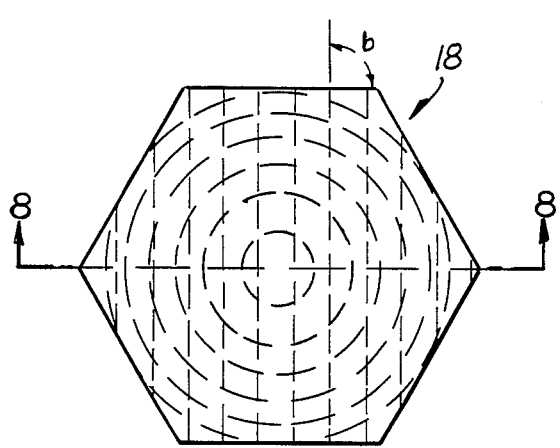
_FIG-7_
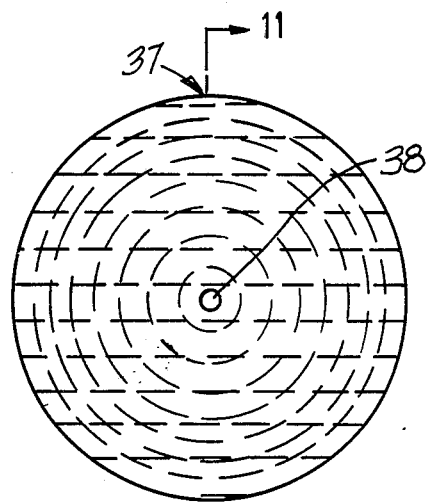
_FIG-10_
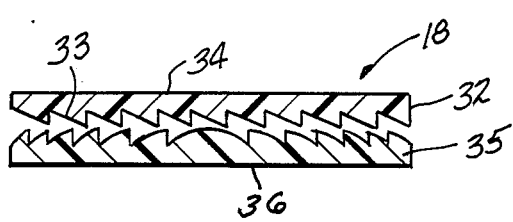
_FIG-8_
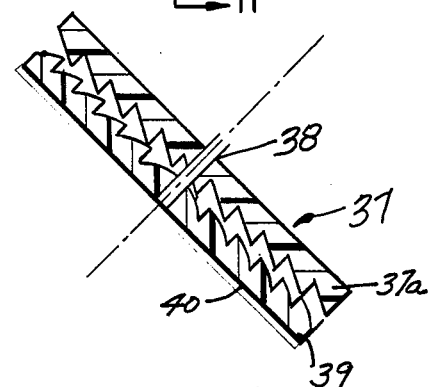
_FIG-11_
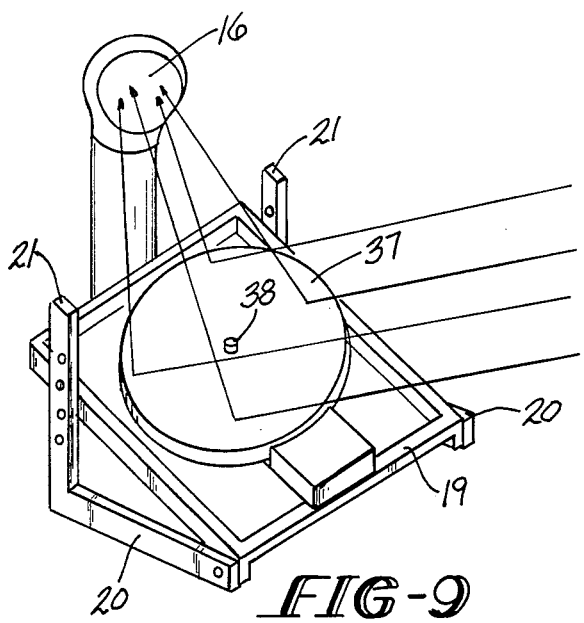
_FIG-9_

SOLAR ENERGY COLLECTOR ARRAY

FIELD OF THE INVENTION

This invention relates to solar energy collection systems, and more particularly, relates to a passive non-tracking system which provides the benefits of a tracking system using new and improved concentrating and reflecting modules that will focus the sun's rays on a collecting device.

BACKGROUND OF THE INVENTION

Solar energy systems have previously been proposed which will reflect the rays of the sun to a central collector. Such systems generally comprise a multiplicity of reflectors which are mechanically, electromechanically or electronically controlled to follow the movement of the sun and reflect the sun's rays to an absorbing or collecting device. In some cases, the positioning of the reflectors are under the supervision of a program which takes into account the latitude of the installation and the elevation and azimuth of the sun for particular seasons, or even days of the year. Such tracking systems require very complex tracking equipment and/or programming, and as a result, are quite expensive. At least one system has been proposed which utilizes a rotating prism to direct the sun's rays to a mirror which reflects through a lens to a target. A system of this type is disclosed in U.S. Pat. No. 4,382,434.

The present invention provides a solar energy collection system which utilizes a plurality of passive lens modules which act to focus and transmit the sun's rays to a collection point or area and essentially provide the equivalent of a tracking system which requires no moving reflectors.

SUMMARY OF THE INVENTION

Briefly stated, the invention in one form thereof comprises a solar energy system which utilizes a plurality of lens-reflector modules to focus and reflect the sun's rays on a collecting or absorbing target. Different groups of modules have different angles between the lens and the reflector so that at least one or one group of modules always reflects the sun's rays to the target.

The modules are preferably constructed utilizing a fresnel lens having a predetermined focal length to focus the sun's rays at the target. The reflectors are preferably echelon refractors with a reflective coating on a rear planar surface. The surfaces of the echelon elements are oriented with respect to the coordinate axes of the associated focusing lens such that at a given azimuth of the sun, one or more or a group of the modules will reflect and focus the sun's rays on the target.

The modules may take several forms. In one embodiment, the lens, echelon element, and a mirror are three separate elements. In other embodiments, the echelon element may have a reflective coating on the planar surface. In still another embodiment, the fresnel lens is formed on one side of a transparent lens, a linear echelon lens is defined on the rear surface, and the echelon prism surfaces are coated with a reflective coating.

The modules are very compact and the lens and echelon element are in very close relation or even stacked relation. Where the lens and the echelon element are on separate members, the planar surfaces thereof are essentially parallel.

An object of this invention is to provide a new and improved solar concentrating and reflecting system of the type described.

Another object of this invention is to provide a new and improved solar energy concentrating and reflecting system of the type described which is quite compact.

A further object of this invention is to provide a new and improved solar energy and concentrating system of the type described which is low cost in manufacture and assembly.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 3 is an exploded view in perspective of a reflecting module embodying the invention;

FIG. 4 is a view of the reflector module of FIG. 3 with the elements thereof in stacked relation;

FIGS. 5 and 6 are views similar to FIG. 4 showing alternate embodiments of the invention;

FIG. 7 is a plan view of a reflecting module embodying the invention which is hexagonol in shape;

FIG. 8 is a section seen in the plane of lines 8—8 of FIG. 7;

FIG. 9 is a perspective view of an alternate embodiment of the invention in which a reflective module embodying the invention relates to follow the azimuth of the sun;

FIG. 10 is a plan view of the reflective module of FIG. 9; and

FIG. 11 is a view seen in the plane of lines 11—11 of FIG. 10.

DETAILED DESCRIPTION OF PREFERRED EMBODIMENTS OF THE INVENTION

Figure 1:
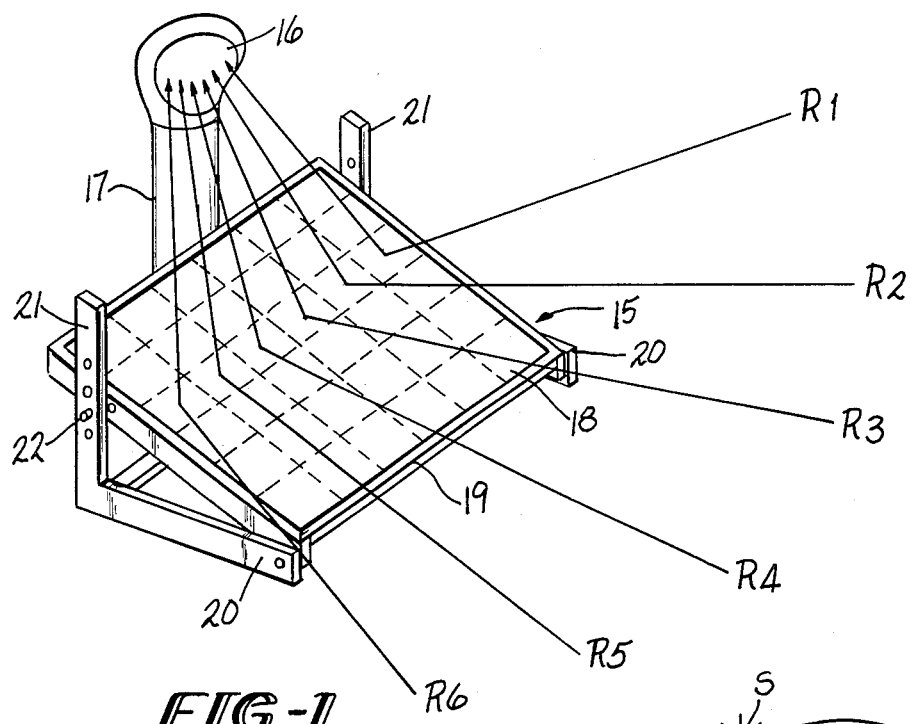
FIG. 1 is a perspective view of a solar energy collector system embodying the invention with reflective modules on a pivotally adjustable support.

Referring now to FIG. 1, there is exemplified an array 15 of lens-reflector modules which are arranged as herein described so that at least some of the condensing reflectors concentrate and reflect the sun's rays on a collecting device 16. Collecting device 16 is mounted on a support member 17 which may include a light or heat responsive device as hereinafter described. Array 15 comprises individual condensing and reflecting modules 18. The modules 18 are arranged in columns and rows (thirty-six as shown) on a carrier 19 which is pivoted to support members 20 at the lower end thereof. Carrier 19 is supported by support members 20 and 21 as by means of pins 22 to vary the angle of inclination of carrier 19. The angle of inclination of carrier 19 may be seasonably adjustable. In FIG. 1, rays of the sun referenced as R1–R6 are shown impinging on the six columns of modules at different times of the day. As the azimuth of the sun changes during the day, different columns of the modules will focus and reflect the sun's rays to collecting device 16. The support structure is only exemplary. In actual practice, motorized means would be used to adjust the angle of support 19.

Figure 2:
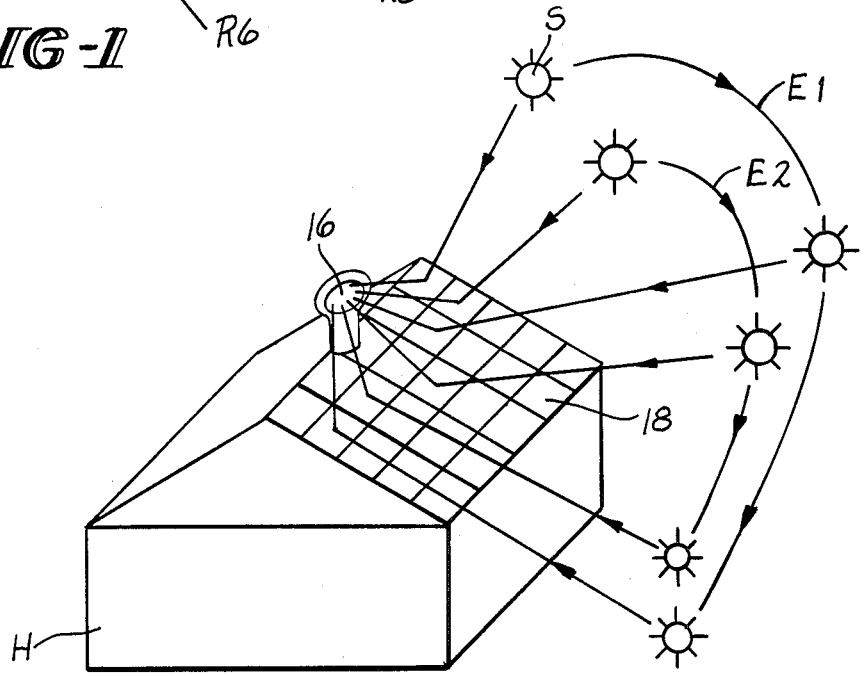
FIG. 2 is a perspective view of a solar energy collector system embodying the invention mounted to the roof of a structure.

FIG. 2 shows an array of modules 18 mounted to the roof of a structure H and exemplifies the sun S at elevations E1 and E2. Here the modules 18 are set for both elevation and azimuth of the sun. As the sun travels at elevation E1, some of the modules will reflect to collecting device 16, while at elevation E2, other modules will reflect to collecting device 16.

The collector 16 may take many forms, it may be a selective surface within the top of support 17, it may be coils with heat absorbing surfaces adapted to have a liquid to be heated passed therethrough, it may be photo-voltair cells to generate electricity or any other suitable device which will connect light to another form of energy. In some cases, the optical fibers may be curved to direct the light energy downwardly in hollow support member to a utilization or absorbing device. The support 17 may contain a thermomotor driving a generator where the thermomotor is driven by the expansion of heated gases.

Reference is now made to FIG. 3 which is an exploded view of one of the modules 18. Each module 18 comprises a refracting lens 23 shown as a fresnel lens, a linear echelon refractor 24, and a mirror 25. FIG. 4 shows the lens 23, the echelon refractor 24, and the mirror 25 stacked into a module. As shown, the prisms 26 of the echelon refractor are at an angle a. As shown in FIG. 3, X, Y and Z axes are defined, and the echelon refractor 24 defines an angle of orientation b with the Y axis. The X and Y axes are referred to as the coordinate axis of the lens while axis Z is the optical axis. This angle b may vary from module to module to determine the angle of reflection. The modules 18 are constructed with a focal length of the lens 23 substantially equal to the distance of the lens to the collector 16 considering that light passes through the lens twice. Thus, light passing through the lens will be refracted the prisms 26 of echelon refractor 24, then reflected by mirror 25 back through echelon reflector 24 and lens 23 to collector 16. In the arrangement shown in FIG. 1, the support 19 is set at an angle in accordance with the latitude of installation and the season. Throughout the daylight hours of a given season, some of the condenser reflector modules will be concentrated on collector 16. Preferably, the angle of inclination b of the echelon surfaces is set so that at least one column of modules 18 reflect simultaneously on collector 16. It will be noted that echelon refractor 24 may be placed in four different orientations with respect to lens 23. This will give four possible angles of reflection to the sun's rays concentrated by lens 23. Additionally, the echelon elements may be formed with several different angles b, as hereinafter described.

With the light passing through the lens twice, the optical power of the lens need not be great optical. This results in a less expensive lens since the grooves defining the lens need not be as deep and the average angle of each facet is more shallow.

While the modules are shown in FIGS. 3 and 4 as comprising three individual elements, it is to be understood that a mirror surface may be formed on the planar underside of echelon refractor 24. Alternatively, the prisms 26 may be oriented to the rear and coated with a reflective material. Additionally, it is preferable to have the fresnel lens 23 inverted in position, as shown in FIG. 5, to protect the fresnel lens surfaces from dirt, dust and the atmosphere generally. Alternately, a transparent sheet or plate may be placed over lens 23.

FIG. 5 shows a module 18 where a lens 23 has been inverted in order to protect the fresnel surface.

FIG. 6 shows a module 18 where a fresnel lens 28 and echelon prisms 29 are defined on a single transparent member 30. The echelon surfaces are coated with a reflective coating 31. A transparent cover plate 28 is provided to protect the fresnel surface 28.

FIGS. 7 and 8 illustrate a further embodiment of the invention where a module 18 is hexagonal in shape. The upper element is a linear echelon refractor 32 having prisms 33 and a coating 34 on the planar surface to minimize reflection of entering light. A fresnel lens 35 faces the prisms 33 and has a reflective coating 36 on its rear planar surface.

The hexagonal shape provides great versatility in that a plurality of lens 35 may be made to different focal lengths and a plurality of echelon elements having different prism angles a, then can be selected and paired appropriately to concentrate all entering light onto a collector. If three types of echelon elements are made with angles of orientation b of 0°, 10°, and 20°, then by rotating the member 32 in sixty degree intervals, it is possible to shift at will the direction of reflected light output in ten degree increments. This provides a module which is well suited to mass production and easy assembly of parts.

FIG. 9 exemplifies a module embodying the invention which is suitable for active tracking. The module 37 is rotatably mounted about an axis 38 on support 19, and is edge driven by a motor (not shown) in a housing 39 on support 19.

The position of the module 37 is synchronized with the azimuth of the sun and the support 19 is adjusted for the seasonal elevation of the sun.

FIG. 10 shows a plan view of the module 37 of FIG. 9.

FIG. 11 is a view seen in the plane of lines 11—11 of FIG. 10.

The module 37 comprises an upper linear echelon refractor 37a and a lower fresnel lens 39 having a reflecting coating 40 on the rear surface thereof. Light will enter the planar surface of element 37a, refract on the prism surfaces, enter lens 39 and refract, reflect from mirror surface 40, refract as it leaves lens 39, refract upon entering element 37a, and again refract as it leaves element 37a. As shown in FIG. 9, light rays L1–L4 strike module 37 and are focused and reflected to collector 16. As the sun moves in azimuth module 37 is rotated accordingly so that the rays L1–L4 are focused on and reflected to collector 16.

While the component parts of the modules 18 have been shown in schematic form, it will be understood that the elements may be held together in a peripheral housing including any spacing members necessary so that each module in its housing may be appropriately orientated with respect to other modules.

It may thus be seen that the objects of the invention set forth, as well as those made apparent from the foregoing description, are efficiently attained. While preferred embodiments of the invention have been set forth for purposes of disclosure, however, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A concentrating solar reflector adapted to focus light on a target positioned and spaced a predetermined distance from said reflector comprising a lens having optical power and a predetermined equivalent focal length, a linear echelon element having parallel prisms defined thereon closely positioned to said lens, and a mirror surface, said lens, said echelon element and said mirror surface having an optical axis and being so arranged that light entering said lens and said echelon element is refracted and reflected back through said lens to said target for a given angle of incidence of light rays thereon, said echelon element being angularly positioned with respect to the optical axis such that said prisms refract and said mirror surface reflects to said target for a predetermined angle of incidence of solar rays on said solar reflector, said target being positioned above said reflector.

2. The concentrating reflector of claim 1 formed on a single transparent member, the lens being fresnel and formed on the upper surface of said member and the echelon surfaces formed on the lower surface, said mirror being provided by a reflective coating on the echelon surfaces.

3. The concentrating reflector of claim 1 wherein said echelon element is above said lens with the planar surface thereof exposed, said lens is a fresnel lens having a planar rear surface coated with a reflective material to define said mirror.

4. The concentrating reflector of claim 1 where said lens is a fresnel lens having its planar surface outward, and said echelon element having a planar surface adjacent said lens, the echelon surfaces of said element being coated with a reflective material to define said mirror, said planar surfaces being essentially parallel.

5. The concentrating reflector of claim 1 where the focal length of said lens is substantially twice the distance between said lens and said target.

6. The concentrating reflector of claim 1 where said reflector is circular in shape and is rotatably driven to follow the azimuth of the sun.

7. The concentrating reflector of claim 6 where the planar surface of said echelon element is outward, said fresnel surface of said lens and said echelon surfaces are facing and the mirror is defined by a reflective coating on the planar surface of said lens.

8. In a solar energy collecting system including a collecting target, a plurality of passive concentrating reflector modules having an optical axis and adapted to reflect the sun's rays to said target, each of said module comprising a fresnel lens having optical power and a predetermined equivalent focal length, a linear echelon element having parallel prisms and a mirror surface, said lens and said echelon element being so angularly positioned with respect to the optical axis that said prisms refract solar rays passing through said lens and said mirror reflects solar rays back through said lens to said target for a predetermined angle of incidence of solar rays on said reflector module.

9. The system of claim 8 where said modules are positioned in a planar array, the angle between the edges of said echelon surfaces and the coordinate axes of said lens varies depend upon the position of a module in said array.

10. The system of claim 8 where said module is formed on a single transparent member, the lens being fresnel and formed on the upper surface of said member and the echelon surfaces the lower surfaces, said mirror being provided by a reflective coating on the echelon surfaces.

11. The system of claim 8 where the echelon element of each module is above the lens with the planar surface thereof exposed, said lens is a fresnel lens having a planar rear surface coated with a reflective material to define said mirror.

* * * * *